United States Patent
Bertholin et al.

(10) Patent No.: US 8,858,221 B2
(45) Date of Patent: Oct. 14, 2014

(54) REACTOR FOR CARRYING OUT VERY HIGH TEMPERATURE AND HIGH PRESSURE REACTIONS

(75) Inventors: Stephane Bertholin, Chaponost (FR); Fabrice Giroudiere, Orlienas (FR)

(73) Assignee: IFP Energies Nouvelles, Rueil-Malmaison Cedex (FR)

(*) Notice: Subject to any disclaimer, the term of this patent is extended or adjusted under 35 U.S.C. 154(b) by 1171 days.

(21) Appl. No.: 12/745,185

(22) PCT Filed: Oct. 24, 2008

(86) PCT No.: PCT/FR2008/001503
§ 371 (c)(1),
(2), (4) Date: Sep. 27, 2010

(87) PCT Pub. No.: WO2009/092876
PCT Pub. Date: Jul. 30, 2009

(65) Prior Publication Data
US 2011/0020758 A1 Jan. 27, 2011

(30) Foreign Application Priority Data
Nov. 30, 2007 (FR) .................................. 07/08373

(51) Int. Cl.
*F23L 1/00* (2006.01)
*F23M 5/00* (2006.01)
*B01J 3/04* (2006.01)
*B01J 19/02* (2006.01)

(52) U.S. Cl.
CPC . *B01J 3/048* (2013.01); *F23M 5/00* (2013.01); B01J 2219/00155 (2013.01); B01J 2219/0263 (2013.01); B01J 2219/00076 (2013.01); B01J 2219/00159 (2013.01); *B01J 19/02* (2013.01); B01J 2219/0286 (2013.01)

USPC .................. 431/2; 431/7; 431/200; 431/207; 422/208; 422/240

(58) Field of Classification Search
CPC ..... Y02E 20/344; Y02E 20/346; F23C 13/00; F23C 13/08; F23C 99/006; B01J 19/02; B01J 3/048
USPC .......... 431/2, 7, 200, 207, 211, 212; 422/208, 422/240, 242, 211
See application file for complete search history.

(56) References Cited

U.S. PATENT DOCUMENTS 2,664,348 A * 12/1953 Bonilla .......................... 422/208
3,041,151 A * 6/1962 Axel .............................. 422/208

(Continued)

FOREIGN PATENT DOCUMENTS

EP 0689868 A1 1/1996
EP 0842696 A1 5/1998

(Continued)

OTHER PUBLICATIONS

Elvers, B., et al. "Refractory Ceramics to Silicon Carbide." (Ullmann's Encyclopedia of Industrial Chemistry), vol. A23, p. 20-29, 1993.

(Continued)

*Primary Examiner* — Avinash Savani
(74) *Attorney, Agent, or Firm* — Millen, White, Zelano & Branigan, P.C.

(57) ABSTRACT

The present invention describes a novel reactor adapted for carrying out chemical reactions at temperatures of up to 1600° C., and at pressures of up to 100 bars. The reactor of the invention has two vessels surrounding the reaction zone, an inner vessel constituted by a refractory material and an outer vessel surrounding the inner vessel and constituted by an insulating material.

15 Claims, 2 Drawing Sheets

(56) References Cited

U.S. PATENT DOCUMENTS

| | | | | |
|---|---|---|---|---|
| 3,366,461 | A | * | 1/1968 | Axel .............................. 422/638 |
| 4,650,651 | A | | 3/1987 | Fuderer |
| 5,591,415 | A | | 1/1997 | Dassel et al. |
| 2003/0167984 | A1 | | 9/2003 | Abdullah et al. |
| 2007/0092415 | A1 | | 4/2007 | Muschelknautz |

FOREIGN PATENT DOCUMENTS

| | | |
|---|---|---|
| FR | 2836989 A1 | 9/2003 |
| WO | 2004098770 A1 | 11/2004 |
| WO | PCT2008001503 R | 10/2008 |

OTHER PUBLICATIONS

Kepets, M., et al. "Mechanical characterization of the role of defects in sintered FeCrAlY foams." (Acta Mechanica Sinica), vol. 23, No. 4, p. 383-398, 2007.

"Fecralloy-lron/Chromium." (Material Information), <www.goodiellow.com/A/Fecralloy-lron-Chromium.html>, 2009.

* cited by examiner

REACTOR FOR CARRYING OUT VERY HIGH TEMPERATURE AND HIGH PRESSURE REACTIONS

FIELD OF THE INVENTION

The present invention relates to the field of reactors for carrying out very high temperature and high pressure reactions.

Reactions of that type are quite often reactions for combustion or partial oxidation of hydrocarbon compounds or reactions which may be explosive in nature, such as chlorination or nitration of various hydrocarbon compounds. More generally, the field of the present invention is that of highly exothermic reactions which may reach temperatures of 1600° C. and necessitate pressures levels which may be as high as 100 bars (1 bar=$10^5$ pascal).

It is these values which will be embraced in the remainder of the text by the expression "high pressure and very high temperature".

EXAMINATION OF THE PRIOR ART

The prior art in the field of reactors which can function at very high temperature and high pressure is fairly scant.

We can cite the document U.S. Pat. No. 4,670,404 which describes a device which can test materials which are subjected to high pressure and temperatures. The device comprises a material test zone, which is itself surrounded by a confinement zone. A mass criterion is set for the device between the mass of the device itself and the mass of the sample subjected to the test. That document does not give any precise information regarding the respective thicknesses of the test and confinement zones and the pressure and temperature levels which can be accommodated in the test zone.

Document EP-0 689 868, which may be considered to constitute the closest prior art, describes a reactor for carrying out reactions at high temperature and high pressure (200 bars/400° C.) using a reaction zone enclosed in a pressurized confinement vessel.

That document does not provide any dimensions for the reactor which, furthermore, cannot accommodate reaction temperatures of more than 500° C.

The problem which the present invention proposes to solve is that of a reaction vessel which can function at very high temperature, i.e. up to 1600° C., and high pressure, up to 100 bars, taking two supplemental constraints into consideration:
  the hydrodynamics of the reaction zone must be controlled in the sense that it must approach either a perfectly mixed flow or a plug type flow, i.e. without mixing of adjacent reaction segments;
  the reaction zone must approach a regime which is as adiabatic as possible so that the temperature in said zone is as homogeneous as possible. In other words, a reaction zone with no temperature gradient is sought.

The material defining the reaction vessel must thus be capable of accommodating temperatures which are much higher than 1000° C.

However, materials which are compatible with temperatures of more than 1000° C. are generally refractory type materials, such as ceramic or concrete. Such materials, however, suffer from two problems which limit their use:
  a) Firstly, they are not impermeable and thus cannot confine the reaction within a well-defined space. In fact, their thermal insulating property is generally due to their porosity, which renders them permeable. This is even more the case when the reaction volume is small and approaches that of the pore volume. Thus, in the case of a reaction zone in the form of small channels cut into the mass of the refractory material, large proportions of the reagents may diffuse into the pores, along with the reaction effluents. Further, at high temperatures, or with repeated cycles of heating and cooling, the refractory material may crack, such cracks increasing the permeable nature of the material and allowing unwanted reactions to develop. In the case of a reaction zone in the form of small channels, such cracks may become larger in volume than the channels themselves and considerably perturb the flow hydrodynamics (the channels are generally used to produce plug flow);
  b) Further, refractory materials are known to be mechanically weak, which limits their service pressure to values of the order of ten bars (1 bar=$10^5$ pascal). However, the desired reaction vessel must be able to contain pressures of the order of 100 bars. This means that the only envelope which could mechanically resist such a pressure is a metal envelope. However, the latter cannot accommodate temperatures of more than 1000° C. even with "refractory" steels which have a limiting service temperature of approximately 1100° C. at atmospheric pressure, which reduces rapidly when the pressure inside the vessel increases.

In the prior art, the solution used when carrying out reactions at high pressure and very high temperatures, to take an example 900° C. and 50 bars, consists more precisely in using a greater or lesser thickness of the refractory material which may be up to approximately 1 or 2 meters, in order to protect the metal vessel and make it operate at a temperature which is sufficiently low (150° C. to 300° C.) to be able to tolerate the operating pressure (50 bars).

Such a great thickness of refractory, apart from the weight it adds which in some cases may become unacceptable, also gives rise to the problem mentioned above of the risks of diffusion of the reagents and the reaction effluents into the refractory material per se, and of the concomitant development of unwanted reactions, to which must be added a greater or lesser perturbation to the reaction flow hydrodynamics.

Thus, the problem which is solved by the reactor of the present invention is that of carrying out highly exothermic chemical reactions which may develop temperatures of up to 1000° C. and pressures of 100 bars, in suitable equipment which confines the reaction zone to a well-defined space and allows reaction effluents to exit while satisfying the temperature specifications concerning pressure vessels.

BRIEF DESCRIPTION OF THE INVENTION

Figure 1:
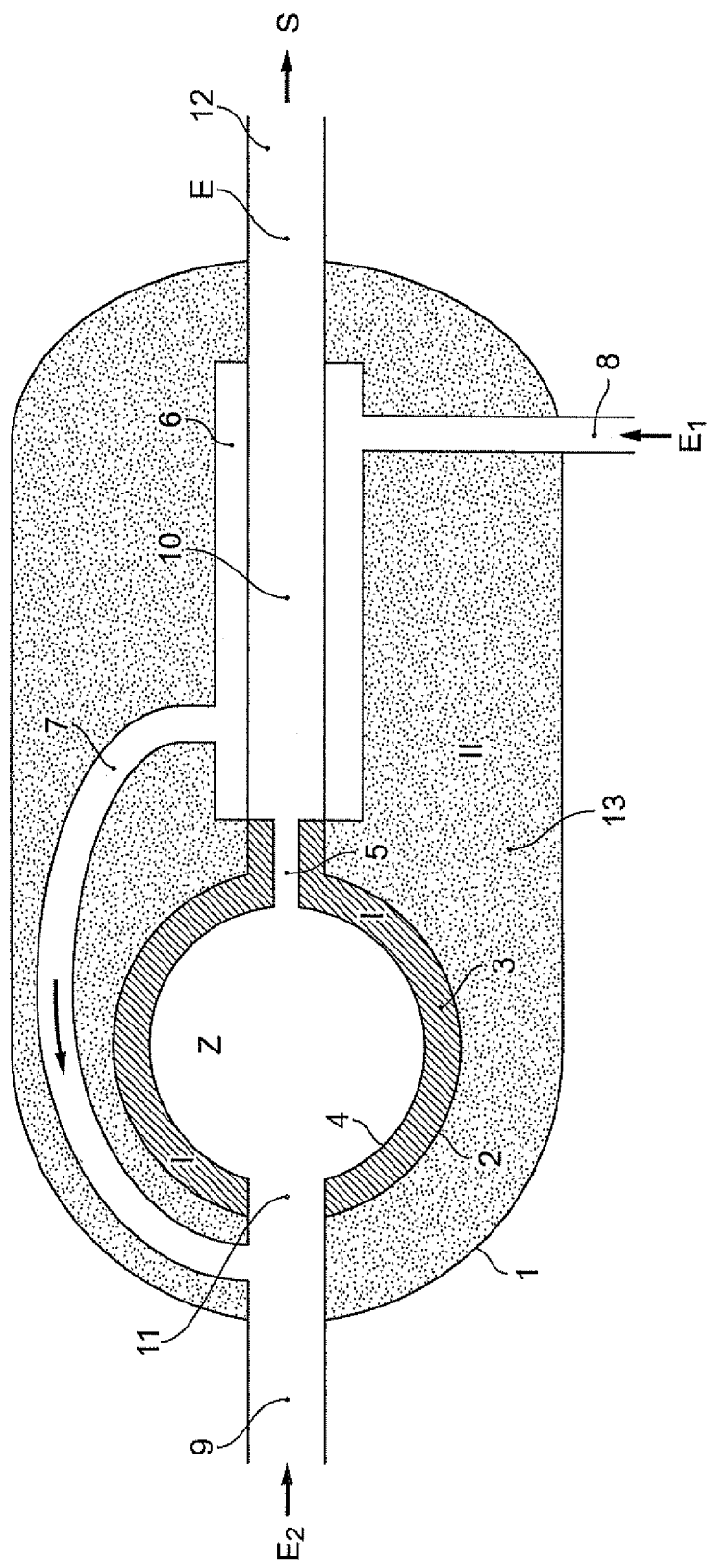
FIG. 1 shows a diagrammatic representation of the reactor of the present invention in which can be seen, starting from the interior and moving to the exterior, the reaction zone Z, the first, inner, vessel denoted I, the second, outer, vessel denoted II, and the integrated feed-effluent exchanger E contained in the second vessel II. In the remainder of the text, we shall refer to the inner vessel I and the outer vessel II.

The present invention describes a solution to the problem discussed above, based on the use of two nested vessels allowing the temperature and pressure stress to be fractionated:

a first inner vessel (denoted I in FIGS. 1 and 2), adjoining the reaction zone Z, is constituted by a refractory material 3 and can reduce the temperature of the reaction zone to a value of approximately 1000° C.;

a second, outer vessel (denoted II in FIGS. 1 and 2) containing the first vessel I and closed by a metal envelope 1 in contact with the outside, is composed of an insulating material 13 which means that said metal envelope 1 can reach a maximum temperature of approximately 350° C.

For this reason, by dint of a reasonable thickness for said metal envelope 1, the latter can tolerate an operating pressure of the order of 100 bars.

The inner vessel I is of relatively low thickness, sufficient to reduce the temperature of the reaction zone Z to a value compatible with the metallic materials which are high temperature resistant, to take an example, to 1000° C. More precisely, the temperature of the inner metal surface 2 defining the inner vessel I is generally less than 1000° C.

The inner metal surface 2 positively confines the reaction zone even when any diffusion of the reagents through the pores of the refractory material 3 constituting the inner vessel I is taken into consideration. The metallic material constituting the inner metal surface 2 is generally a refractory steel.

At a temperature of approximately 1000° C., the strength of refractory steels is still low and it would not be sufficient to resist a pressure of the order of 100 bars.

The outer vessel II is designed to resist a pressure very close to the operating pressure of the reaction zone Z such that the difference in pressure between the inner vessel I and the outer vessel II is not more than a predetermined value, generally in the range 0.1 to 3 bars, and preferably in the range 0.3 bars to 2 bars.

In order to maintain the necessary pressure inside the outer vessel II, including the transitional phases, a means for controlling the pressure difference between the inner vessel I and the outer vessel II is thus used, the regulating agent possibly being an inert gas introduced into the outer vessel II, for example.

The outer vessel II essentially contains an insulating material 13 the density of which is lower than that of the refractory material 3 used for the inner vessel I. The outer vessel II may be fairly thick, as the risk of diffusion of the reagents no longer exists because of the inner metal surface 2 surrounding the reaction zone Z which acts as a seal.

The thickness of the outer vessel II is designed to produce a temperature for the outer metal envelope 1 which is compatible with environmental specifications, i.e. 150° C. to 350° C.

For this reason, the outer metal envelope 1 is generally constituted by a stainless type steel.

In a further important aspect, by dint of a feed-effluent exchanger E which is wholly integrated into said reactor, the reactor of the present invention allows the temperature of the reaction effluents to be reduced to a temperature which is compatible with the metallic material of the outer metal envelope 1 used to close the outer vessel II.

This feed-effluent exchanger E is placed within the outer vessel II. Without this exchanger, it would not be possible to pass through the outer metal envelope 1 communicating with the outside completely safely as the outlet pipe 12 for effluents S would be at a temperature which was too high with respect to that of said outer metal envelope 1.

It may be possible to finish cooling the effluents S using an auxiliary cooling system placed upstream or downstream of the internal exchanger E (not shown in FIG. 1).

DETAILED DESCRIPTION OF THE INVENTION

The present invention can be defined as a reactor for carrying out reactions at high temperature (up to 1600° C.) and high pressure (up to 100 bar) comprising the following elements, starting from the interior and moving to the exterior of the reactor:

a reaction zone Z defined by an inner wall 4 and surrounded by an inner vessel I;

an inner vessel I defined by an inner metal surface 2 and the inner wall 4, said inner vessel I being constituted by a refractory material 3, having an inlet for a portion of the reagents 11, an inlet 7 for the other portion of the reagents, and an outlet pipe 5 for effluents which is substantially contiguous with the central pipe 10 of the integrated exchanger E;

an outer vessel II comprised between an outer metal envelope 1 and the inner metal surface 2 of the inner vessel I, said outer vessel II being filled with an insulating material 13, and enclosing the exchanger E allowing the reaction effluents to be cooled and the reagents to be pre-heated;

an outer metal envelope 1, enclosing all of the constituent elements and having at least two reagent inlet pipes, namely the pipe 8 communicating with the integrated exchanger E and the pipe 9 which is substantially contiguous with the inlet 11 and communicates with the reaction zone Z, and at least one effluent outlet pipe 12;

a feed-effluent exchanger E contained inside the outer vessel II connected to the inlet pipe 8 for at least a portion of the reagents and to the effluent outlet pipe 12, and communicating with the reaction zone Z by means of an inner pipe 7;

a device for regulating the pressure difference between the inner vessel I and the outer vessel II.

The outer vessel II filled with an insulating material 13 acts as an insulation zone which allows the outer metal envelope 1 to reach a temperature in the range 150° C. to 350° C.

The inner vessel I surrounding the reaction zone Z can essentially reduce the temperature of said reaction zone to a value of approximately 1000° C. measured at the inner metal surface 2.

The reactor for carrying out very high temperature and high pressure reactions in accordance with the invention has a reaction zone Z the volume of which, termed the reaction volume, with respect to the total volume of the reactor is generally in the range 0.005 to 0.2.

The value of the ratio between the reaction volume and the total volume of the reactor is differentiated as a function of the capacity of the reactor:

a) when the reaction volume is less than 100 liters, the ratio of the reaction volume to the volume of the reactor is preferably in the range 0.005 to 0.01;

b) when the reaction volume is in the range 100 to 1000 liters, the ratio of the reaction volume to the total volume of the reactor is preferably in the range 0.01 to 0.05;

c) when the reaction volume is more than 1000 liters, the ratio of the reaction volume to the total volume of the reactor is preferably in the range 0.05 to 0.2.

The thickness of the inner vessel I containing the refractory material 3 with respect to the diameter of the reaction zone Z is generally in the range 0.05 to 0.5 and preferably in the range 0.1 to 0.3.

The reactor of the invention also comprises a system for regulating the pressure of the outer vessel II using an inert gas introduced into the outer vessel II so as to limit the pressure difference between said vessel II and the inner vessel I to a value which is generally in the range 0.1 to 3 bars, and preferably in the range 0.3 to 2 bars.

The exchanger E can be defined as a feed-effluent exchanger insofar as the heat transfer fluid is constituted by the reaction effluents derived from the reaction zone Z and traverses said exchanger E via the central pipe 10. The central pipe 10 communicates with the outlet pipe 5 from the reaction zone Z. Preferably, the axis of symmetry of the exchanger E is approximately coincident with the axis of symmetry of the reaction zone Z.

The central pipe 10 of the exchanger E communicates with the exterior of the reactor by traversing the outer metal envelope 1. Because of heat exchange, the reaction effluents moving inside the pipe 10 are cooled to a temperature in the range 150° C. to 350° C., and are thus at a temperature which is compatible with that of the outer metal envelope 1.

A portion of the reagents, generally the fuel in the case of a combustion reaction, is introduced via the inlet pipe 8 which traverses the outer metal envelope 1 and communicates with the exchange zone 6 of the exchanger E. Said exchange zone 6 is extended by a pipe 7 of suitable form which preferably joins the inlet pipe 9 for the other portion of the reagents. The pipe 7 is preferably completely contained in the outer vessel II. In certain cases which fall entirely within the scope of the present invention, the pipe 7 may join the reaction zone Z via an inlet which is distinct from the inlet 9 or 11.

The exchanger E generally surrounds the outlet pipe 10 for the reaction effluents over a section with a length included between the outlet 5 from the reaction zone Z and the outlet 12 from the reactor per se.

However, other geometries are possible for the exchanger E and fall within the scope of the invention provided that said exchanger E remains contained inside the outer vessel II.

The refractory material 3 constituting the inner vessel I may be a refractory concrete or, preferably, a high temperature resistant ceramic, i.e. at least up to 1600° C. The refractory concrete or the ceramic has a porosity of less than 50% by volume, and a density of more than 1000 kg/m$^3$.

The ceramic may be based on one of the following materials: alumina, mullite, zirconia, silicon nitride or silicon carbide. The choice of material or the combination of materials is made so as to produce a good compromise between a low thermal conductivity which can reduce the temperature desired at the inner metal surface 2 and a limited porosity to reduce the risk of diffusion of the reagents into the material 3.

The insulating material 13 used to fill the outer vessel II is a refractory material which is resistant to temperatures of the order of 1000° C., and having a low thermal conductivity which means that the outer metal envelope 1 can reach temperatures in the range 150° C. to 350° C.

Preferably, the thermal conductivity of the material 13 used in the outer vessel II is less than 0.5 W/(m.K) (abbreviation for Watt per meter per Kelvin) and more preferably less than 0.1 W/(m.K).

This low thermal conductivity can reduce the target temperature using thicknesses for the outer vessel II which remain relatively low, of the order of a few centimeters, which is an essential feature of the construction, since said outer vessel II has a thickness which is dimensioned to resist a pressure which may be of the order of 100 bars.

The insulating material 13 constituting the outer vessel II also has a low density, preferably less than 500 kg/m$^3$, to limit the weight of the assembly.

The insulating material 13 constituting the outer vessel II is selected from the following materials: alumina or silica-alumina, and may be disposed inside said outer vessel II in the form of beads with a size which may be from a few millimeters to 3 cm, or extrudates with a diameter of a few millimeters and with a length of up to 3 cm.

The insulating material 13 may also be used in the form of a wool or machined blocks in order to match the shape of the outer metal envelope 1.

The reactor of the present invention may be used in various processes employing highly exothermic reactions. As an example, it may be possible to use partial oxidation or combustion processes in which the oxidant E1 is introduced via the inlet pipe 8, pre-heated in the internal exchanger E and fed through the pipe 7 at the outlet of the exchanger E, then brought into contact with the fuel E2 introduced via the inlet pipe 9.

The oxidant/fuel mixture is directed via the inlet pipe 11 into the reaction zone Z inside which the partial oxidation or combustion reactions occur. The reaction effluents leave said reaction zone Z via the outlet pipe 5 and traverse the internal exchanger E via the central conduit 10 acting as a heat transfer fluid, before being evacuated out of the reactor via the outlet pipe 12.

More generally, the reactor of the present invention may be used in any partial oxidation or combustion process in which the temperature inside the reaction zone Z is in the range 1000° C. to 1600° C., and the pressure inside the reaction zone Z is in the range 40 bars to 100 bars.

Figure 2:
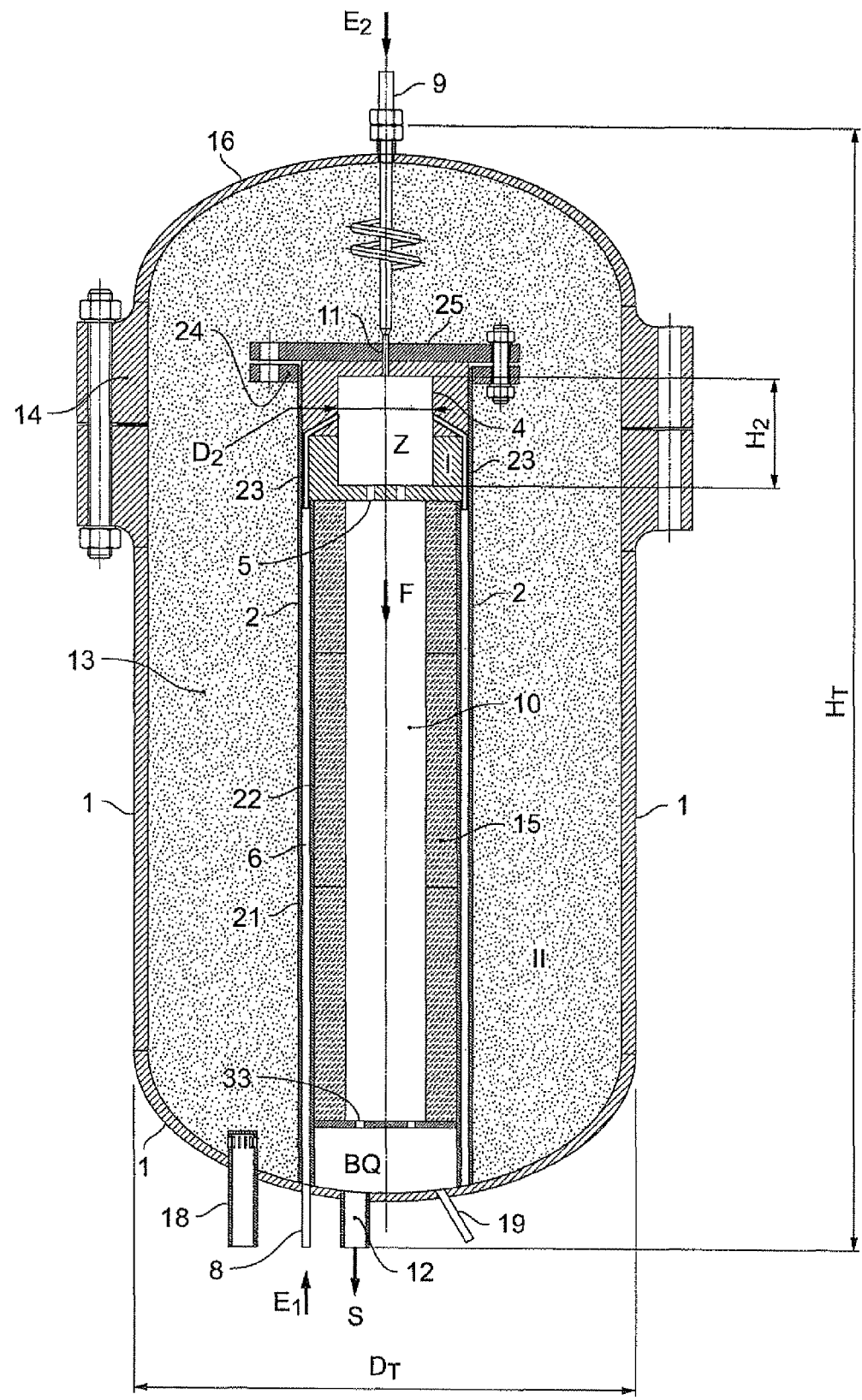
FIG. 2 corresponds to an embodiment of the reactor of the invention which reiterates the numerals of the elements appearing in FIG. 1 with the addition of supplemental numerals corresponding to certain elements necessary for that embodiment.

Example in Accordance with the Invention (FIG. 2)

The reactor is constituted by an outer metal envelope 1 composed by assembling the shell 1 and the upper hemispherical cap 16 after closing the flange 14.

The outer metal envelope 1 is formed from type 316 L stainless steel.

The outer vessel H included between the outer metal envelope 1 and the inner metal surface 2 is dimensioned so that it can resist an operating pressure of 50 bar and a maximum temperature of 350° C.

The inner metal surface 2 corresponds to the outer surface of the pipe 21.

The outer vessel II is 350 mm thick.

The inner metal surface 2 is formed from Incoloy MA956 type refractory steel.

The principal dimensions of the reactor are: a diameter (DT) of 1.1 m and a height (HT) of 2.5 m.

The inner vessel I is formed by the tube 21 welded to the bottom of the shell 1 and closed by the flange 24.

The inner vessel I defining the reaction zone Z is constituted by a refractory material 3 which is formed from a ceramic based on alumina (more than 90% by weight Al$_2$O$_3$) with a density of 1700 kg/m$^3$ and a porosity of 22%.

The thermal conductivity of this ceramic is 0.95 W/(m.K).

Said refractory concrete can tolerate the temperature, 1584° C., of the fumes produced and provides thermal insulation which reduces the temperature of the inner metal surface 2, corresponding to the outer surface of the pipe 21, to a maximum temperature of 1000° C.

The dimensions of the reaction zone Z are: a diameter (D2) of 250 mm and a height (H2) of 300 mm.

The thickness of the inner vessel I is 50 mm.

A second tube 22 which is also welded to the base of the shell 1 is contained in the pipe 21.

The annular zone 6 comprised between the pipes 21 and 22 is extended by two channels 23 which are hollowed directly into the refractory material 3 of the inner vessel I to supply the reaction vessel Z.

These channels 23 act as the tube 7 shown in the diagrammatic FIG. 1.

The space constituting the outer vessel II is filled with an insulating material 13 which is a ceramic based on silica (more than 80% by weight $SiO_2$) with a density of 200 kg/m$^3$, and with a thermal conductivity at 1000° C. of 0.04 W/(m.K), which can reduce the maximum temperature of the outer metal envelope 1 to 350° C.

The reaction zone Z is supplied in part by the mixture of fuel and water E2 via the inlet pipe 9 continued by the channel 11 hollowed directly into the material 3, and also by oxygen E1 which penetrates into the annular zone 6 via the introduction pipe 8.

The rates of injection of the reaction fluids into the reaction zone Z and the orientation of said injections have been optimized by computation to generate as much turbulence as possible in the reaction zone Z and to obtain an oxidant/fuel mixture which is as homogeneous as possible in the whole volume of said zone.

The fumes produced by combustion at 1584° C. are evacuated via the orifices 5 hollowed into the material 3 of the inner vessel I and descend in the tube 10. As it passes through the tube 10, heat exchange takes place between the descending fumes F and the oxygen rising via the annular zone 6.

The inner surface of the tube 22 is protected by a thermal screen 15 in order to protect it from the temperature of the combustion fumes F, which is still high. This screen is composed of a material 3 of the same nature as that used to produce the inner vessel I.

The assembly constituted by the pipe 10, the thermal screen 15 and the annular zone 6 constitutes the integrated exchanger E.

The exchanger E can pre-heat the oxygen to a maximum temperature of 1000° C. before it enters the reaction zone Z.

The fumes leave from the lower portion of the exchanger E via the orifices 33 and penetrate into a cooling volume BQ into which water may be injected via the tube 19 to reduce the temperature of the fumes to a temperature of 350° C. The cooled fumes S then leave the reactor via the tube 12.

Nitrogen is used to keep the pressure of the outer vessel II to a value of 50 bars plus or minus 1 bar by means of a stream of nitrogen entering the pipe 18.

The reactor of the invention treats a flow of 24.3 kg/h of fuel and 217.5 kg/h (denoted E2 in FIG. 2).

The flow rate of pure oxygen (denoted E1) is 100.2 kg/h.

The pressure in the reaction zone is 50 bars (i.e. 5 MPa).

The temperature of the fumes generated by combustion F is 1584° C.

The composition of the fumes generated is: (weight %):
$O_2$: 4.39%;
$H_2O$: 73.8%
$CO_2$: 21.9%
$CO+H_2$: traces (less than 0.1%).

The invention claimed is:

1. A reactor for carrying out reactions at high temperature, up to 1600° C., and high pressure, up to 100 bar, comprising:
    a reaction zone (Z) defined by an inner wall (4) and surrounded by an inner vessel (I);
    an inner vessel (1) defined by an inner metal surface (2) and the inner wall (4), said inner vessel (I) being constituted by a refractory material (3) positioned between said inner metal surface (2) and said inner wall (4), having an inlet (11) for a portion of the reagents, and an outlet pipe (5) for effluents which is substantially contiguous with a central pipe (10) of an exchanger (E), the porosity of said refractory material (3) being less than 50% by volume with a density of more than 1000 kg/m$^3$, wherein thickness of said inner vessel with respect to the diameter of the reaction zone Z is in the range of 0.05 to 0.5;
    said reaction zone being in fluid communication with an inlet for another portion of the reagents;
    an outer vessel (II) comprised between an outer metal envelope (1) and the inner metal surface (2) of the inner vessel (I), said outer vessel (II) being filled with an insulating material (13), and enclosing said exchanger (E) allowing the reaction effluents to be cooled and the reagents to be pre-heated, said insulating material (13) having a thermal conductivity of less than 0.5 W/(m.K), and a density of less than 500 kg/m$^3$;
    said outer metal envelope (1), enclosing the outer vessel (II) and having at least two reagent inlet pipes, namely pipe (8) which communicates with said exchanger (E) and pipe (9) which is substantially contiguous with said inlet (11) for a portion of the reagents and which communicates with said reaction zone (Z), and at least one effluent outlet pipe (12);
    wherein said exchanger is a feed-effluent exchanger (E) contained inside the outer vessel (II), and which is connected to inlet pipe (8) for at least a portion of the reagents and to effluent outlet pipe (12), and said feed-effluent exchanger (E) communicates with the reaction zone (Z) by means of an inner pipe (7) connected to said inlet for another portion of the reagents; and
    a device for regulating the pressure difference between the inner vessel (I) and the outer vessel (II) so that the difference in pressure between inner vessel (I) and outer vessel (II) is in the range of 0.1 to 3 bars.

2. A reactor according to claim 1, in which the volume of the reaction zone with respect to the total volume of the reactor is in the range of 0.005 to 0.2.

3. A reactor according to claim 1, in which: the reaction volume is less than 100 liters, and the ratio of the reaction volume to the volume of the reactor is in the range 0.005 to 0.01.

4. A reactor according to claim 1, in which the thickness of the inner vessel (I) containing the refractory material (3) with respect to the diameter of the reaction zone (Z) is in the range of 0.1 to 0.3.

5. A reactor according to claim 1, in which the material constituting the inner metal surface (2) is an iron/chromium/aluminium steel or a nickel/chromium steel.

6. A reactor according to claim 1, in which the material constituting the outer metal envelope (1) is a stainless steel.

7. A partial oxidation or combustion process comprising:
    performing said process in a reactor according to claim 1, wherein oxidant (E1) is introduced via the inlet pipe (8), is pre-heated in the internal exchanger (E), is introduced into the inner pipe (7) connected to said inlet for another portion of the reagents and is brought into contact with the fuel (E2) which is introduced via the inlet pipe (9), the oxidant/fuel mixture is directed via the inlet (11) into the reaction zone (Z) in which the partial oxidation or combustion reactions occur, the reaction effluents leaving said reaction zone (Z) via the outlet pipe (5) and traversing the exchanger (E) via the central conduit (10), where they surrender their heat to the oxidant (E1), before being evacuated out of the reactor via the outlet pipe (12); and
    in which the temperature inside the reaction zone (Z) is in the range 1000° C. to 1600° C. and the pressure inside the reaction zone (Z) is in the range 50 to 100 bars.

8. A reactor according to claim 1, wherein said thermal conductivity of said insulating material (13) is less than 0.1 W/m.K.

9. A reactor according to claim 1, in which: the reaction volume is in the range of 100 to 1000 liters and the ratio of the reaction volume to the total volume of the reactor is in the range of 0.01 to 0.05.

10. A reactor according to claim 1, in which: the reaction volume is more than 1000 liters and the ratio of the reaction volume to the total volume of the reactor is in the range of 0.05 to 0.2.

11. A reactor according to claim 4, wherein said difference in pressure between the inner vessel (I) and the outer vessel (II) is in the range of 0.3 to 2 bars.

12. A process according to claim 7, wherein said difference in pressure is in the range of 0.3 to 2 bars.

13. A reactor according to claim 1, wherein said inner pipe (7) is completely contained in the outer vessel (II).

14. A reactor according to claim 1, wherein said inlet for another portion of the reagents is connected to pipe (9) which is substantially contiguous with said inlet (11).

15. A reactor according to claim 1, wherein said inner pipe connected to said inlet for another portion of the reagents joins said the reaction zone Z via an inlet which is distinct from both the pipe (9) and the inlet (11) for a portion of the reagents.

* * * * *